C. J. PILLING & F. H. JEWETT.
ARTIFICIAL LEG.
APPLICATION FILED MAY 20, 1916.

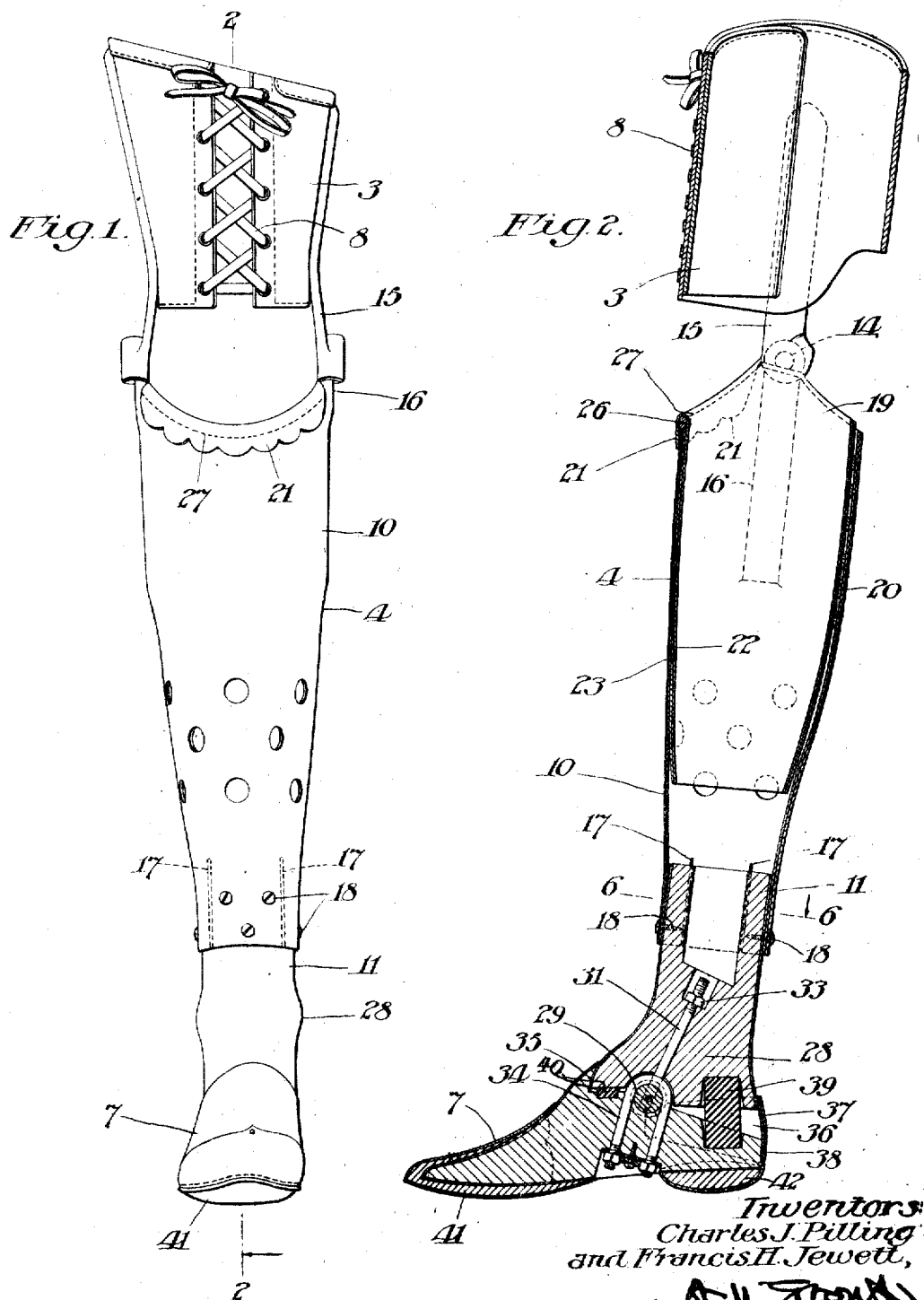

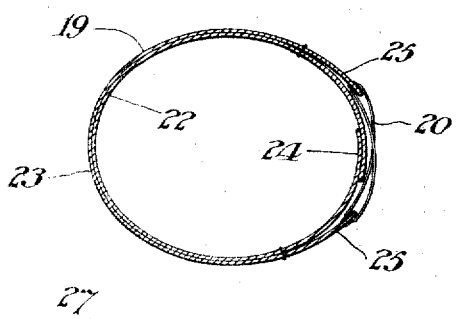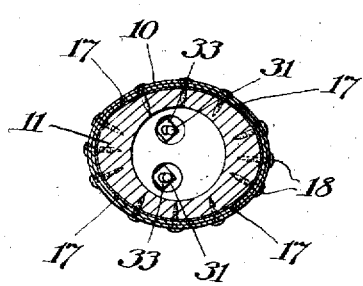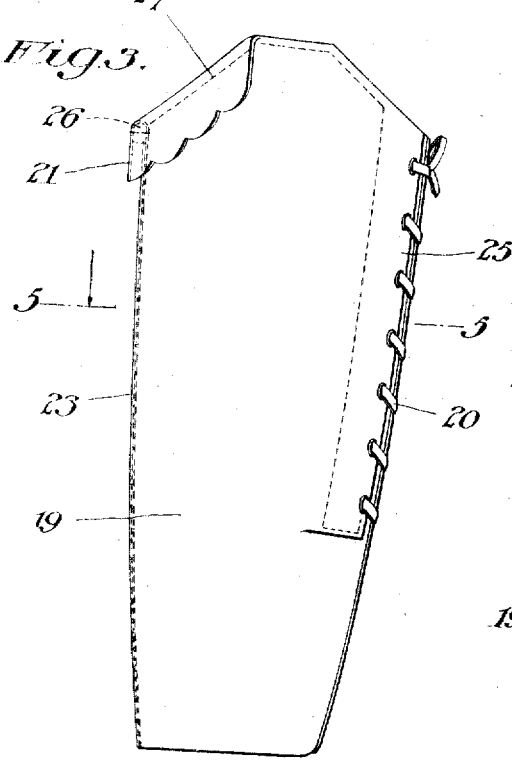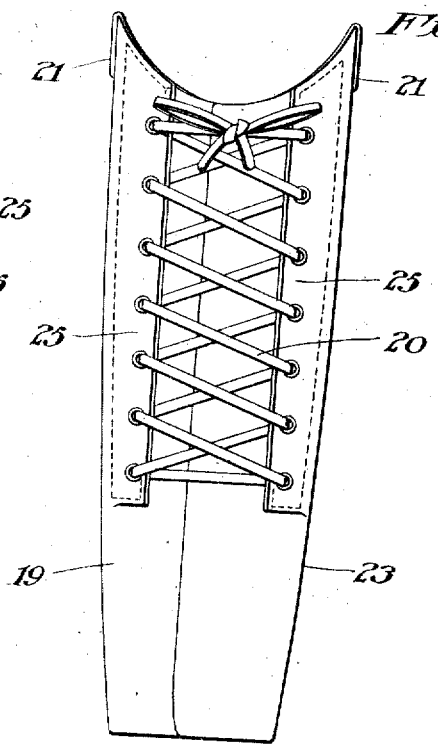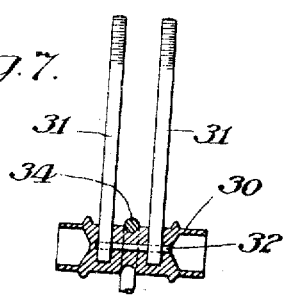

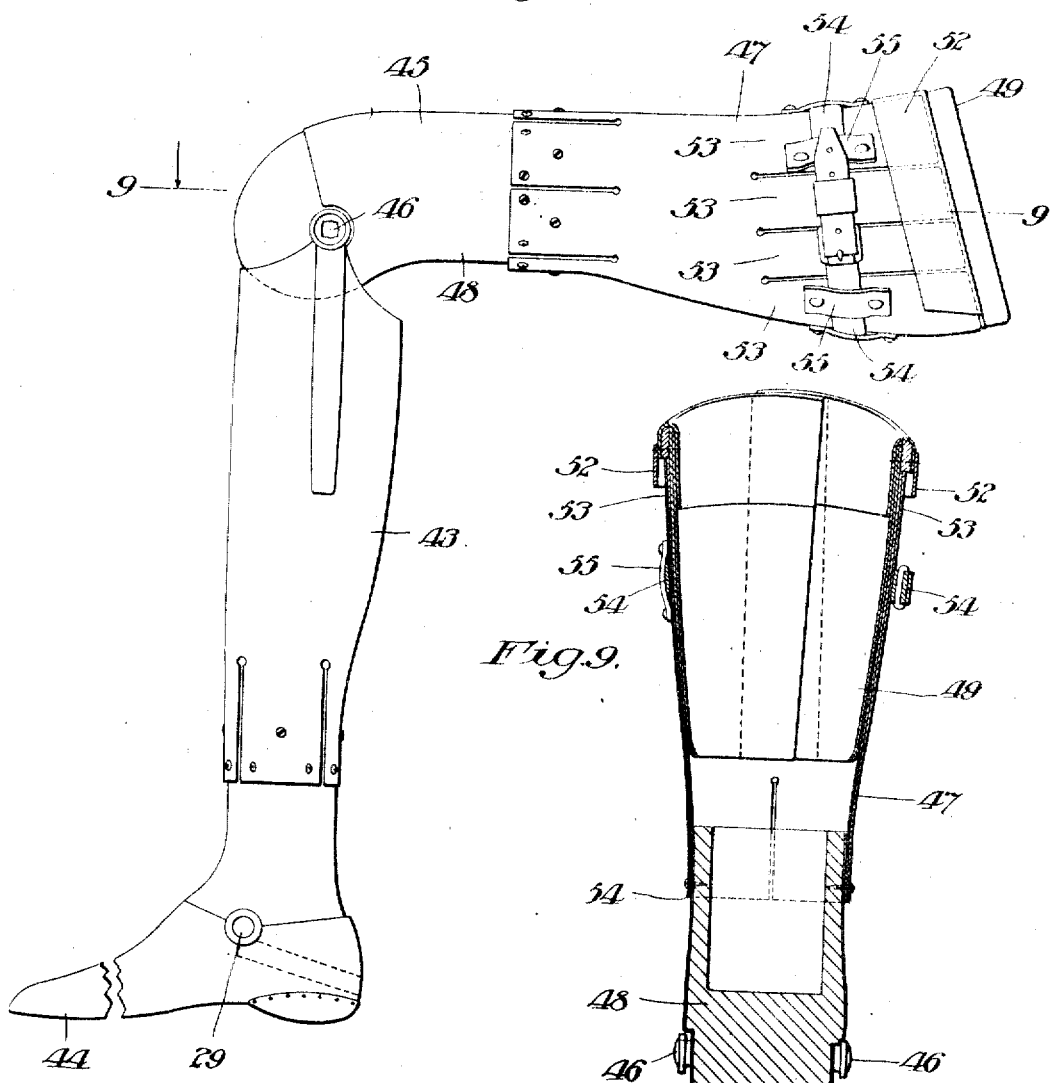

1,211,222.

Patented Jan. 2, 1917.
4 SHEETS—SHEET 4.

Inventors:
Charles J. Pilling
and Francis H. Jewett,
By A. V. Groesbeck
Attorney.

UNITED STATES PATENT OFFICE.

CHARLES J. PILLING, OF LANSDOWNE, AND FRANCIS H. JEWETT, OF PHILADELPHIA, PENNSYLVANIA, ASSIGNORS TO PILLING ARTIFICIAL LIMB COMPANY, OF PHILADELPHIA, PENNSYLVANIA, A CORPORATION OF PENNSYLVANIA.

ARTIFICIAL LEG.

1,211,222.                Specification of Letters Patent.         Patented Jan. 2, 1917.

Application filed May 20, 1916. Serial No. 98,724.

*To all whom it may concern:*

Be it known that we, CHARLES J. PILLING, citizen of the United States, residing at Lansdowne, county of Delaware, State of Pennsylvania, and FRANCIS H. JEWETT, citizen of the United States, residing in the city and county of Philadelphia, State of Pennsylvania, have invented certain new and useful Improvements in Artificial Legs, of which the following is a specification.

The object of our invention is to provide an artificial leg of novel, simple and efficient construction having provision: first, whereby the length thereof may be adjusted to the length of the natural leg of the wearer so that artificial legs made in accordance with my invention may be carried in stock and adjusted to fit each particular case, avoiding the necessity of constructing legs of prescribed lengths to fit particular cases; secondly, whereby the socket member for receiving the stump of the amputated leg is properly supported within its leg member in a manner to permit it to be readily removed or replaced; thirdly, whereby the foot member shall be strong, light and durable; fourthly, whereby various novel advantages are gained by various novel features of construction, as will hereinafter appear.

With this object in view our invention consists in the novel construction and combinations of parts hereinafter fully described and claimed.

Figure 10:
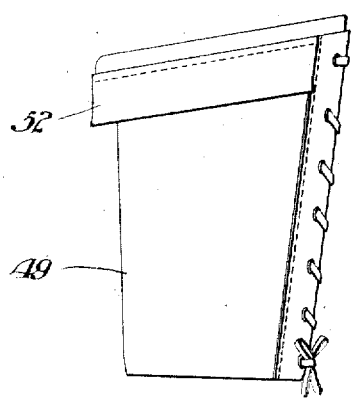
Figure 11:
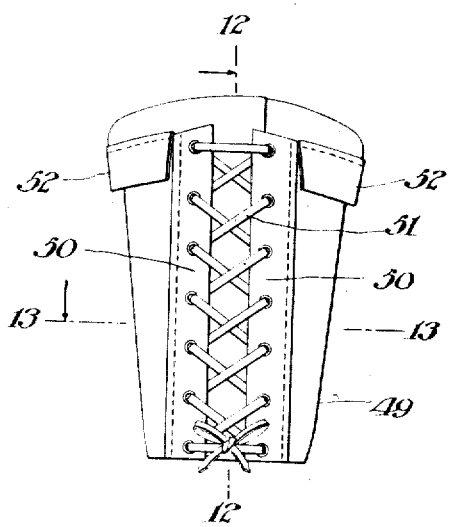
Figure 12:
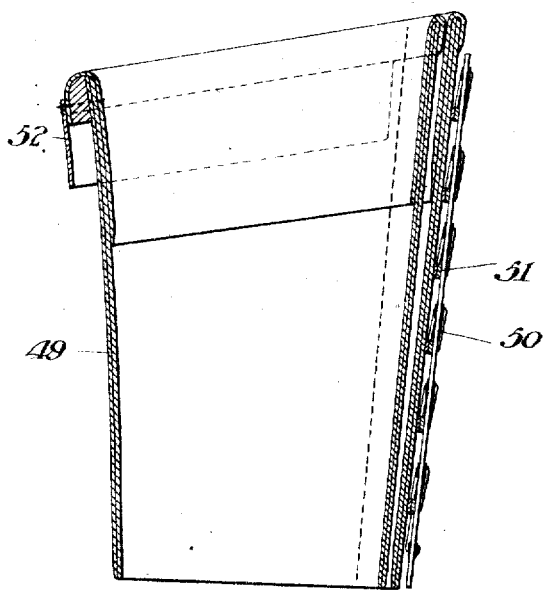
Figure 13:
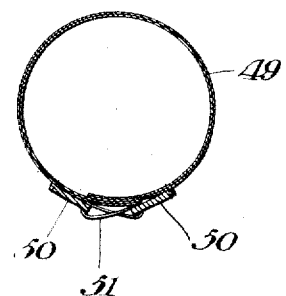

In the accompanying drawings illustrating our invention: Figure 1 is a front view of an artificial leg embodying our invention and constructed to take the place of a natural leg amputated below the knee. Fig. 2 is a vertical section, on line 2—2 of Fig. 1. Fig. 3 is a side view of the socket member shown in Figs. 1 and 2. Fig. 4 is a back view of the socket member shown in Fig. 3. Fig. 5 is a horizontal section, on line 5—5 of Fig. 3. Fig. 6 is a horizontal section, on line 6—6 of Fig. 2. Fig. 7 is a sectional detail showing the U-bolt for the ankle joint. Fig. 8 is a side view of an artificial leg embodying our invention and constructed to take the place of a natural leg amputated above the knee. Fig. 9 is a longitudinal section on line 9—9 of Fig. 8. Fig. 10 is a side view of the socket member shown in Figs. 8 and 9. Fig. 11 is a back view of the socket member shown in Fig. 10. Fig. 12 is a vertical section, enlarged, on line 12—12 of Fig. 11. Fig. 13 is a horizontal section, on line 13—13 of Fig. 11.

Referring first to Figs. 3 to 7, inclusive, which illustrate an artificial leg constructed in accordance with our invention to take the place of a natural leg amputated below the knee, 3 designates an upper leg member, 4 a lower leg member and 7 a foot member. The upper leg member 3 comprises a suitable flexible band which is adapted to inclose the leg of the wearer above the knee, and which is split vertically to permit it to be expanded while being applied to or removed from the leg. The sides of the split portion are drawn together by a suitable lacing 8, as shown, which may be adjusted to cause the band or member 3 to properly fit the leg. The lower leg member 4 comprises an upper section 10 and a lower section 11. The upper section 10, of the leg member 4 is made hollow to receive, in the upper portion thereof, the stump of the leg, and the lower leg member 4 is hinged to the upper leg member 3, at 14, by means of bars or braces 15 and 16 which are suitably secured to the sides of the upper member 3 and the sides of the upper section 10 of the lower member 4, respectively, the bars 15 projecting downwardly from the member 3 and the bars 16 projecting upwardly from the member 4 and being pivoted to the bars 15 to form the hinge joint 14 between the members 3 and 4, which corresponds to the knee joint of the wearer. The lower end portion of the upper section 10 of the member 4 surrounds and is fitted to the upper end portion of the lower section 11 thereof, in a manner to permit the sections 10 and 11 to be adjusted relative to each other to lengthen or shorten the lower leg member 4. The lower end portion of the upper section 10 is split vertically or longitudinally, at 17, to permit the section 10 to yield and to expand slightly when the section 11 is inserted therein, to provide a tight fit. The body of the section 10 is provided with a covering of leather or other suitable flexible material which is secured to the exterior thereof and which surrounds the section 10 and covers the split portions 17 thereof and permits the slight expansion of the section 10, previously mentioned. After the proper longitudinal adjustment of the lower leg member 4 has been made, the sections 10 and 11 are secured together by a number of wood screws 18 which extend through openings in the section 10 and are screwed into the section 11 which is made of wood so as to be capable of receiving the screws 18 at any point of adjustment. Before the section 11 is inserted into the section 10, hot glue is applied to the interior of the section 10 or to the exterior of the section 11 or to both where they contact with each other, and when the glue hardens and sets it forms an additional means of securing the sections 10 and 11 together.

To support the stump of the wearer's leg within the leg member 4, we provide a socket member 19 which is removably supported within the member 4. This socket member 19 is formed of suitable flexible material and it is tapered to conform to the stump. The member 19 is split vertically or longitudinally to be circumferentially adjustable to fit the stump, and the sides of the split portion are connected and held together in different positions of adjustment by a suitable lacing 20 which may be adjusted, as desired, in fitting the member 19 to the leg stump. The upper end of the socket member 19 is provided with a cuff 21 which extends outwardly over the upper end of the leg member 4 and then downwardly and embraces the upper end thereof in a manner to support the socket member 19. In the present form of embodiment of our invention shown in Figs. 1 to 7, inclusive, the body of the socket member 19 comprises inner and outer layers of material 22 and 23, respectively, which are secured together by cementing and suitable stitching. The meeting edge portions of the inner layer 22 lap each other at the split portion 24 of the socket member 19; and the adjacent edges of the outer layer 23 form flaps 25 on the respective sides of the split portion 24 of the socket member; the flaps 25 being provided with suitable perforations for the reception of the adjusting lacing 20, and the lapping edge portions of the inner layer 22 serving as a guard to protect the stump from the lacing 20, extending between the flaps 25. The upper edge portion of the inner layer 22 is turned outwardly and downwardly to form the cuff 21, and a spacing member 26 is inserted between the turned down edge portion of the inner layer 22 and the body thereof in the upper portion of the cuff 2 to maintain it spaced from the body of the socket member 19 to receive the upper portion of the lower leg member 4. The cuff 21 is maintained in its turned down position and the spacing member is retained therein by a suitable line of stitching 27 which extends through the cuff 21, the spacing member 26 and the body of the layer of material 22.

The lower end of the lower section 11 of the lower leg member 4 terminates in an ankle portion 28 to which the foot member 7 is hinged, at 29, to permit the foot member 7 to have the required motion relative to the leg member 4. This hinge connection comprises a pivot pin 30 having its upper portion seated in a cavity in the bottom of the ankle portion 28, and having its lower portion adapted to turn in a socket or cavity in the foot member 7. The pin 30 is secured to the ankle portion 28 or the section 14 by two securing bolts 31, the lower ends of which extend into the pivot pin 30 at right angles thereto and are secured therein by a pin 32 which is driven longitudinally into the pivot pin 30 and through perforations in the bolts 31, thus securing the pin 30 and bolts 31 together to be applied to or removed from the section 11 as a unit. The upper ends of the securing bolts 31 are screw-threaded and provided with nuts 33 which engage the bottom wall of a depression in the top of the section 11 and securely hold the pivot pin 30 within its cavity in the ankle piece 28 or section 11. The pivot pin 30 is maintained in working engagement with its socket in the foot member 7 by an inverted U-bolt 34 which embraces the pivot pin 30 and extends downwardly therefrom through the foot member 7. The ends of the U-bolt 34 are screw-threaded to receive nuts which engage the top wall of a cavity in the bottom of the foot member 7 and hold the bolt in place. The forward portion of the ankle piece 28 is adapted to work up and down in a cavity 35 in the foot member 7, and the rearward portion of the ankle piece is adapted to work up and down in a cavity 36 formed within a sheet metal guard 37 which extends around the heel portion of the foot member 7. The lower portion of the guard 37 is set into the foot member 7 so that the outer faces of the member 7 and guard 37 will be flush, and the guard 37 is secured to the member 7 by suitable screws. The guard 37 and member 7 are provided with a covering 38 of suitable material which is secured to the exterior surfaces thereof and which crosses the joint between them. This construction enables us to construct the body of the foot member 7 of wood for strength and lightness, and to construct the wall of the socket 36 of thin and strong material. A yielding rubber spring 39 inserted within the cavity 36 between the rearward portion of the ankle piece 28 and the heel portion of the foot member 7 tends to turn the foot member 7 on the hinge 29 and holds a rubber cushion block 40 in the foot member 7 normally against the forward portion of the ankle piece 28 and permits the foot member 7 to be moved on the hinge 29 in the usual manner. The foot member 7 is provided with the usual sole and heel pads 41 and 42, respectively.

Referring now to Figs. 8 to 13, inclusive, illustrating an artificial leg, constructed in accordance with our invention, to take the place of a natural leg amputated above the knee, the lower leg member 43 and the foot member 44 are constructed substantially the same as the members 4 and 7 shown in Figs. 1, 2 and 6, excepting that the socket member 19 is omitted and the upper end portion of the leg member 43 is fashioned to form, with the upper leg member 45, a suitable artificial knee portion, wherein the members 43 and 45 are pivoted or hinged together, at 46. In this construction the upper leg member 45 comprises an upper section 47 and a lower section 48. The lower end of the lower section 48 forms the knee, and the upper end of the lower section 48 is surrounded by and longitudinally adjustable within the lower end of the hollow upper section 47. The sections 47 and 48 are adapted to be secured together in different positions of adjustment by screws and glue between the sections in the same manner as the sections 10 and 11 of the lower leg member 4, previously described, are secured together, for the purpose of lengthening or shortening the upper leg member 45 to bring the knee joint 46 of the artificial leg into proper relation to the knee joint of the natural leg of the wearer, before securing the sections 47 and 48 of the leg member together. The upper portion of the hollow upper section 47 is provided with a socket member 49 which is removably supported therein and which is adapted to receive the natural leg stump. This socket member, while being constructed slightly different in detail from the socket member 19, previously described, is like the same in that it is split vertically to be circumferentially adjustable, that the sides of its split portion are provided with flaps 50 which are held together by a suitable lacing 51, and that it is provided with a cuff 52 which extends outwardly over the upper end of the upper section 47 of the leg member 45 to support the socket member 49 and to permit it to be removed from the leg member 45. In order that the upper portion of the upper section 47 of the upper leg member 45 may be circumferentially adjustable to properly fit the socket member 49 therein, when the socket member 49 is adjusted circumferentially to fit the stump of the natural leg, we split the upper end portion of the section 47 into tongues 53, and surround the tongues 53 with an adjustable strap 54 provided with a suitable buckle which may be readily manipulated to effect the desired adjustment. The strap 54 is prevented from moving longitudinally of the tongues 53 from its proper position by short straps 55 crossing the strap 55 and riveted to the tongues 53.

We claim:

1. In an artificial leg, a hollow leg member, and a socket member within the leg member and adapted to receive the stump and comprising a body portion removably contained within the leg member and having its upper end turned outwardly and downwardly forming a cuff embracing the top of the leg member, a spacing member secured to the socket member between the main body thereof and the cuff and resting upon the top of the leg member and supporting the socket member therein.

2. In an artificial leg, a hollow section, a second section forming a continuation of the hollow section, the two sections constituting a leg member, the hollow section surrounding and being fitted to said second section, the portion of the hollow section which surrounds said second section being split longitudinally to permit the hollow section to expand when said second section is inserted therein to provide a tight fit, and said second section being adapted to be adjusted longitudinally within the hollow section, and means to secure said sections together in different positions of adjustment.

3. In an artificial leg, a hollow section, a second section forming a continuation of the hollow section, the two sections constituting a leg member, the hollow section surrounding and being fitted to said second section, the portion of the hollow section which surrounds said second section being split longitudinally to permit the hollow section to expand when said second section is inserted therein to provide a tight fit, and said second section being adapted to be adjusted longitudinally within the hollow section, an expansible covering surrounding the hollow section and crossing the split portion thereof and secured thereto, whereby said covering may expand in conformity with the expansion of the split portion of the hollow section to provide a smooth and uninterrupted outer surface at all times for the hollow section, and means to secure said sections together in different positions of adjustment.

4. In an artificial leg a foot member formed of wood and having a heel portion, a sheet metal guard set into the foot member and having its outer surface flush with the outer surface of the foot member and extending upwardly from said heel portion and forming a pocket, means to secure the guard to the foot member, and a leg section pivoted to the foot member and having a part adapted to enter said pocket.

5. In an artificial leg a foot member formed of wood and having a heel portion, a sheet metal guard set into the foot member and having its outer surface flush with the outer surface of the foot member and extending upwardly from said heel portion and forming a pocket, means to secure the guard to the foot member, a covering secured to the foot member and the guard and crossing the joint between them, and a leg section pivoted to the foot member and having a part adapted to enter said pocket.

6. A connecting element for artificial legs comprising a pivot pin, a securing bolt extending into the pivot pin substantially at right angles thereto, and a securing pin extending longitudinally within the pivot pin and penetrating the securing bolt.

In testimony whereof we affix our signatures hereto.

CHARLES J. PILLING.
FRANCIS H. JEWETT.